United States Patent [19]

Gregorovic

[11] 4,270,447

[45] Jun. 2, 1981

[54] MOBILE INSTALLATION FOR THE COLD TREATMENT OF REFUSE

[76] Inventor: Dragutin Gregorovic, quai Marcellis 1, 4020 Liege, Belgium

[21] Appl. No.: 69,554

[22] Filed: Aug. 24, 1979

[30] Foreign Application Priority Data

Nov. 20, 1978 [BE] Belgium ............... 872.140

[51] Int. Cl.³ .............................. B30B 15/30
[52] U.S. Cl. .................... 100/70 R; 100/71; 100/74; 100/91; 100/96; 100/100; 100/117; 100/137; 100/215; 366/346; 209/39; 209/163
[58] Field of Search ............ 100/71, 91, 96, 97, 150/100, 117, 137, 70 R, 74, 75, 215; 366/279, 346; 209/213, 215, 219, 162, 163, 39

[56] References Cited

U.S. PATENT DOCUMENTS

| 2,389,068 | 11/1945 | Longhway | 366/346 |
|---|---|---|---|
| 2,594,054 | 4/1952 | McNamara | 100/100 |
| 2,961,977 | 11/1960 | Coleman | 100/100 |
| 3,188,942 | 6/1965 | Wandel | 100/117 |
| 3,357,380 | 12/1967 | Siracusa | 100/70 R |
| 3,547,577 | 12/1970 | Lovercheck | 100/70 R |
| 3,968,625 | 7/1976 | Lindenmaier | 100/100 |
| 4,212,548 | 7/1980 | Miyaguchi | 366/346 |

*Primary Examiner*—Billy J. Wilhite
*Attorney, Agent, or Firm*—Robert E. Burns; Emmanuel J. Lobato; Bruce L. Adams

[57] ABSTRACT

A mobile installation for the treatment of household refuse comprises an elongated vehicle having a centrally located water tank into which the refuse is dumped. Heavier components which settle to the bottom of the tank are transported by an endless conveyor from one end of the tank to a magnetic separator which removes magnetic metal. Other heavy components drop into a crusher and the crushed material is mixed with additives such as cement or coal dust and compressed in a press. Lighter components are removed from the opposite end of the tank by an upwardly inclined screw conveyor which squeezes out much of the water. The lighter components are then mixed with additives such as cement and compressed by an extruder press.

7 Claims, 4 Drawing Figures

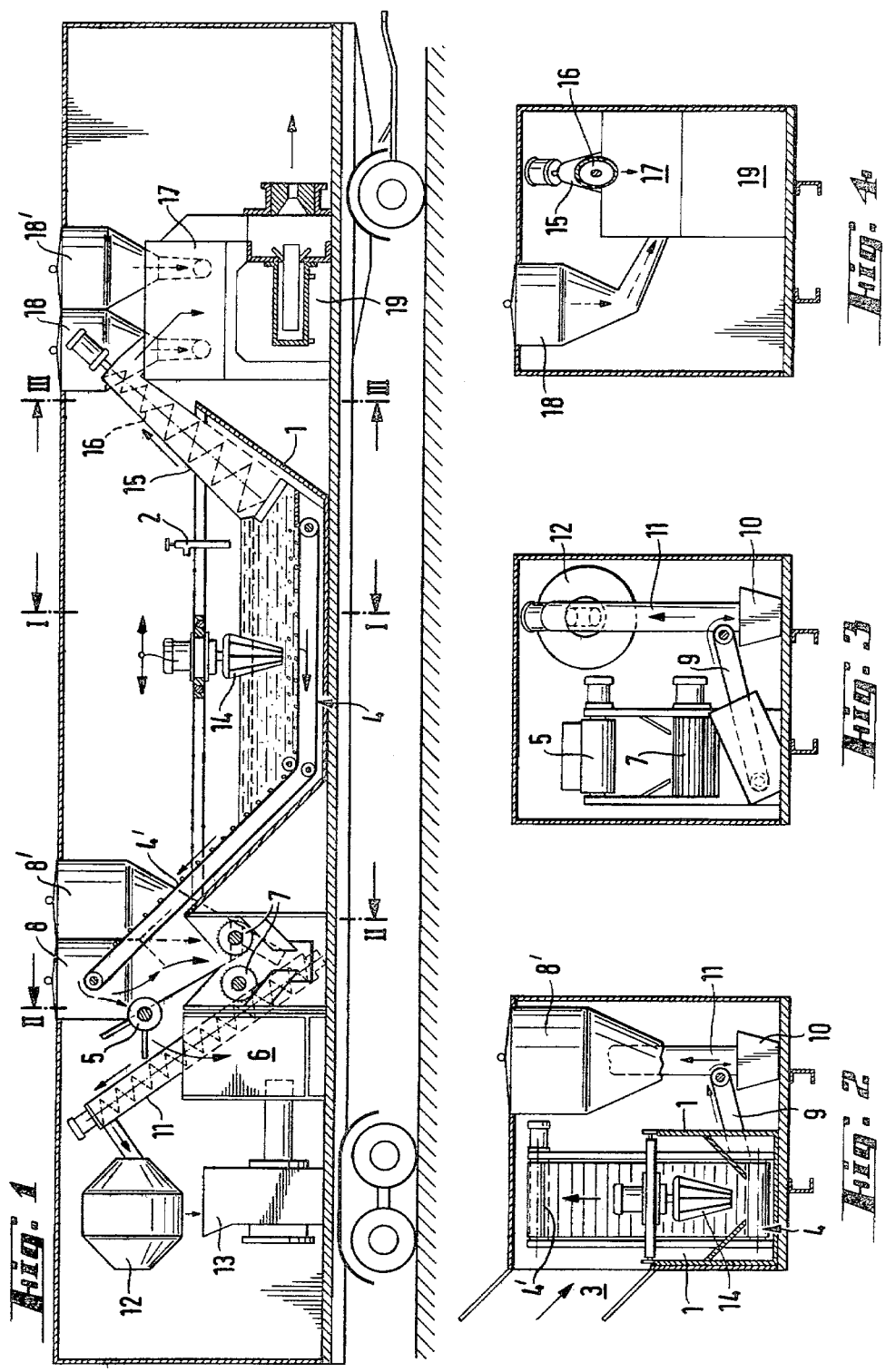

MOBILE INSTALLATION FOR THE COLD TREATMENT OF REFUSE

FIELD OF INVENTION

This invention relates to a complete, mobile or transportable installation for carrying out the complete, cold treatment of refuse, in particular household refuse, the installation being intended for catering for the totality of the refuse of a small community, for example about thirty households, and thus for the inhabitants of an apartment block.

BACKGROUND OF THE INVENTION

Although proposals have already been made for installations for the total, cold treatment of refuse by settling out in a liquid medium in order to achieve a first separation of the heavy and light elements for subjecting them to different cycles of operations, all such proposals were for the treatment of large quantities of household or industrial waste which are brought to such installations by regular collections; in spite of a certain rationalization, standardization of trash cans, and an obligation to use leak-proof bags, it cannot be denied that such installations and methods of collection contribute to the pollution and deterioration of our streets and that it appears desirable to attempt to treat waste materials as rapidly as possible and before they are thrown into the street to be picked up.

SUMMARY OF THE INVENTION

The present invention proposes a solution to this problem, at least in regard to small communities.

For this purpose, according to this invention, the mobile installation for the cold treatment of household refuse is characterized in that it is composed of a transportable, elongated platform or the fitted-out platform of a truck, comprising, in its central region and extending over more or less one longitudinal half, a water basin equipped with an inlet valve adapted to be fitted to the water supply, along the base of which elongated basin a mobile conveyor of the endless belt type travels throughout the length and extending substantially across the width, which conveyor conveys, to a first end of the basin and then upwards, the heavier elements and those of high density of the waste which falls inevitably to the bottom of the basin while a mobile mixer, equipped with a rotary element, immersed and displaceable from one end to the other of the basin drives towards the second end of the basin the lighter elements, which are picked up there by a slightly conical, inclined tube equipped with a helical screw which brings the lighter elements above a mixer, which may also be supplied with additives such as sterilizing or binding agents, the mixer being situated above an extruder press, whereas at the first end the conveyor discharges the heavy elements into a magnetic separation drum situated above a scrap metal recovery basin and a crusher supplied with the non-metallic elements, to which fillers and binding agents are added, the whole assembly of materials to be then brought by a belt conveyor and raised by a helical screw elevator to a mixer situated above a press.

Although all the devices indicated above of the installation are preferably grouped on a single platform of a vehicle, it is equally possible to form it in three parts, that is to say in three platforms and/or on three vehicles, one of which would comprise the settling basin and the separation devices, while the other two vehicles or the other two platforms would comprise respectively, one of them the devices for treating the heavy elements and the other the devices for treating the light elements. Other variants of embodiment are also possible.

BRIEF DESCRIPTION OF DRAWINGS

In order to assist in an understanding of the invention it is now described with reference to an attached drawing, which shows by way of example and in a non-limiting manner:

FIG. 1, a diagrammatic view of a vehicle comprising an installation according to the invention,
FIG. 2, a section along II—II of FIG. 1,
FIG. 3, a section along III—III of FIG. 1,
FIG. 4, a section IV—IV of FIG 1,

DESCRIPTION OF PREFERRED EMBODIMENT

In the drawing, particularly in FIG. 1, the following are shown:

Reference 1, a settling basin containing water supplied by a valve 2, into which basin household wastes are tipped through a side filler opening 3 (FIG. 2).

Reference 4 an endless belt situated in the bottom of the basin 1 and conveying the heavy refuse to one end; this endless belt 4 comprising an upwardly inclined portion 4' conveying the heavy refuse into a magnetic drum 5 for extracting the principal metallic elements, which are tipped into a container 6, in which the scrap metal is collected.

The other heavy elements fall into a crusher 7, as do also the additional materials coming from silos 8, 8', such as cement and coal dust. The assembly of crushed heavy elements and the additional materials are conducted by a belt conveyor 9 to the bottom hopper 10 of a screw elevator 11 which brings the materials to a mixer 12. After this operation, the assembly of the elements and additional materials are compressed in the press 13, in order to produce kinds of bricks which could be used, for example, as fuel in the case where an additional material such as coal dust is used or as filler materials for roads. and/or for construction; where there is an additional material such as cement it should be noted that the number of silos 8,8' could be much more than two and it would be possible to provide, in addition to a certain additional quantity of cement, for the introduction also and in combination for example of sand, gravel etc.

The lighter elements for their part have a greater or lesser tendency to float under the effect of the mobile, rotary mixer 14 which, by moving from one end of the settling basin 1 to the other, in addition brings these elements to one end of the basin 1 just beneath an elevator 15 with helical screw 16, both elevator and helical screw being slightly conical so as to assure, not only a first mixing, but also, as a result of a certain degree of compaction, the eliminating of a large proportion of the water; these lighter elements, having been thus subjected to a first mixing, are discharged into a mixer 17, e.g. sterilizing or binding agents, into which additives coming from silos 18, 18' (here again the number of these silos may be greater) can also be discharged.

As seen in FIG. 1 the mobile rotary mixer 14 comprises a motor 14a driving a downwardly extending rotor 14b. The mixer is mounted on a carriage 14c having wheels 14d running on upper edges of the side walls of settling basin 1.

The light elements, thus mixed and complemented by additives which may also be additional elements such as cement depending upon the material produced, for example compost, lightweight bricks or cladding or insulating panels, are then generally completed by packaging or wrapping sheets.

These thus treated light elements will be compressed by an extruder press 19.

The various parts of the mobile installation according to the present invention have been briefly described and illustrated in a diagrammatic manner; in fact, though each of them should be provided, they can be modified and adapted according to the materials which it is desired to produce, which may vary depending upon the additional materials available and also upon the greater or lesser local demand for the materials to be produced.

Moreover, the composition itself of the household waste is liable to be subject to considerable differences according to whether the community is a rural or urban community and depending upon the standard of life of the community; moveover, although the installation is not intended particularly for the treatment of waste and refuse from large-scale industry, it can be perfectly well adapted for the treatment of community refuse from semi-industrialized zones, commercial firms, or a large commercial complex.

In the figures of the drawing, the installation has been shown situated inside a large rectangular container of the type which can be towed by a truck; it is, of course, possible to use a simple movable, open platform where the installation is to be employed in an industrial zone or a movable container for a residential zone, and it is also possible for ease of transportation or in order to reduce the length of the vehicle to sub-divide the installation into two or three parts (three platforms, three containers and, for example, three trucks) to be connected together in-situ by pipes or, for instance, by the portion 4' of the endless belt 4 and the screw elevator 15, 16 being placed just above the treatment devices, respectively, for the heavy and for the light elements.

Preferably, in order to avoid any pollution, the installation is therefore placed in a container which is entirely closed with the exception of a filler opening 3; naturally, various access doors will also be provided. In the case of small treatment installations according to this invention, it is envisaged that less elaborate products will be manufactured than with large installations such as products coming from the heavy elements. Apart from the scrap metal recovered, it will be easy to produce, by using lime and cement as additives, a construction material in the form of blocks which will be capable of use, after crushing, as a base material for roads and highways; whereas from the lighter elements, to which additives such as coal dust or used oils will have been added, it will be possible to obtain a solid fuel in the form of briquettes or, after removing small waste such as metal, glass etc. by sieving and after incorporating the desired additive, a crushed compost which can be employed as an agricultural fertilizer.

Small installations, apart from the fact that they enable waste materials and refuse to be treated at the place of origin, are also advantageous due to the fact that they will treat refuse of a relatively homogeneous type, for example from an urban, semi-industrial or rural region or again the generally highly consistent industrial waste of a firm, which in certain cases will require some modifications and even simplifications in the layout of the installation by the elimination of certain of the devices envisaged.

What is claimed is:

1. A transportable complete installation for the cold treatment of refuse, in particular household refuse, comprising:
    a transportable elongated platform having in a central portion and extending over approximately half the length of said platform an elongated water basin, means for supplying water to said basin to provide a water bath therein,
    a belt conveyor extending along the whole length of the bottom of said basin to a first end of said basin and then upwards to transport heavier elements of said refuse which sink to the bottom of said basin, out of said basin and to an elevated location above a first end portion of said platform,
    first treating means on said first end portion of said platform comprising magnetic separating means positioned to act on said heavier elements to remove magnetic materials therefrom, means for crushing non-magnetic heavier elements discharged from said belt conveyor, first means for supplying additive material, first means for mixing said crushed elements with said additive material to form a first mixture, means for pressing said first mixture of heavier non-magnetic elements and additive material into blocks,
    means for moving to the second end of said basin lighter elements of said refuse which do not sink, transport means for removing said lighter elements from said second end of said basin and raising said lighter elements to an elevated position above a second end portion of said platform, and
    second treating means on said second end portion of said platform comprising second means for supplying additive material, means for mixing said lighter elements with said additive material to form a second mixture, and an extrusion press receiving said second mixture of lighter elements and additive material from said mixing means and compacting and extruding said second mixture.

2. An installation according to claim 1, in which said first mixing means is located above said pressing means.

3. An installation according to claim 2, comprising means for transporting crushed non-magnetic elements from said crushing means to said mixing means, said transporting means comprising a second belt conveyor receiving said crushed non-magnetic elements from said crushing means and transporting them laterally of said platform, and an inclined screw conveyor receiving said elements from said second belt conveyor and elevating them to said first mixing means.

4. An installation according to claim 1, in which said first means for supplying additive material delivers such material to said crushing means.

5. An installation according to claim 1, in which said means for moving said lighter elements to the second end of said basin comprises a track extending lengthwise of said basin, a mobile mixer comprising a rotary element immersed in said bath and displaceable along said track from one end of said basin to the other.

6. An installation according to claim 1, in which said transport means for removing lighter elements from said second end of said basin comprises a slightly conical upwardly inclined tube, and a helical screw rotating in said tube to elevate said lighter elements while comprising them to expel water therefrom.

7. An installation according to any one of claims 1 to 6, comprising an enclosure completely enclosing said water basin and said first and second treating means except for a filler aperture for introduction of said refuse into said water basin.

* * * * *